(12) United States Patent
Eick et al.

(10) Patent No.: US 7,552,582 B2
(45) Date of Patent: Jun. 30, 2009

(54) MORE ELECTRIC AIRCRAFT POWER TRANSFER SYSTEMS AND METHODS

(75) Inventors: Chris D. Eick, Phoenix, AZ (US); Louie T. Gaines, Phoenix, AZ (US); Mitchell J. Laidlaw, Tempe, AZ (US); Dwayne M. Benson, Chandler, AZ (US); Larry A. Portolese, Granger, IN (US); Brian L. Flaherty, Granger, IN (US); Wayne T. Pearson, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 538 days.

(21) Appl. No.: 11/290,745

(22) Filed: Nov. 29, 2005

(65) Prior Publication Data

US 2006/0272313 A1 Dec. 7, 2006

Related U.S. Application Data

(60) Provisional application No. 60/688,496, filed on Jun. 7, 2005.

(51) Int. Cl.
*F02C 3/10* (2006.01)

(52) U.S. Cl. .................................... 60/39.163; 60/792

(58) Field of Classification Search .............. 60/39.163, 60/792, 802, 791, 793; 290/1 C, 4 C
See application file for complete search history.

(56) References Cited

U.S. PATENT DOCUMENTS

| | | | |
|---|---|---|---|
| 3,498,057 A * | 3/1970 | Kronogard et al. ....... | 60/39.163 |
| 3,786,696 A | 1/1974 | Aleem | |
| 4,041,696 A | 8/1977 | Morrison | |
| 4,251,987 A | 2/1981 | Adamson | |
| 4,326,375 A * | 4/1982 | Kronogard ............... | 60/39.163 |
| 4,403,292 A | 9/1983 | Ejzak et al. | |
| 4,572,961 A | 2/1986 | Borger | |
| 4,684,081 A | 8/1987 | Cronin | |
| 4,694,187 A | 9/1987 | Baker | |
| 4,908,565 A | 3/1990 | Cook et al. | |
| 4,912,921 A | 4/1990 | Rice et al. | |
| 4,967,096 A | 10/1990 | Diemer et al. | |
| 5,309,029 A | 5/1994 | Gregory et al. | |
| 5,694,765 A | 12/1997 | Hield et al. | |
| 5,783,932 A | 7/1998 | Namba et al. | |
| 5,845,483 A | 12/1998 | Petrowicz | |
| 5,899,411 A | 5/1999 | Latos et al. | |

(Continued)

OTHER PUBLICATIONS

EP Search Report, 06115067.8 dated May 30, 2008.

*Primary Examiner*—Michael Cuff
*Assistant Examiner*—Andrew Nguyen
(74) *Attorney, Agent, or Firm*—Ingrassia Fisher & Lorenz, P.C.

(57) ABSTRACT

A turbofan gas turbine propulsion engine includes a system to transfer power from the low pressure turbine to the high pressure turbine and/or extract additional load from the low pressure turbine during certain turbofan engine operational conditions. The systems include a hydrostatic power transfer system that includes a hydraulic pump and a hydraulic motor coupled to the low pressure and high pressure turbine, respectively. The systems additionally include a mechanical and electrical load shifting/loading sharing systems that use clutches and gear assemblies to share and/or shift load between the turbines.

7 Claims, 3 Drawing Sheets

U.S. PATENT DOCUMENTS

| | | |
|---|---|---|
| 6,082,967 A | 7/2000 | Loisy |
| 6,124,646 A | 9/2000 | Artinian et al. |
| 6,142,418 A | 11/2000 | Weber et al. |
| 6,278,262 B1 * | 8/2001 | Ullyott ......................... 322/22 |
| 6,344,700 B1 | 2/2002 | Eisenhauer et al. |
| 6,467,725 B1 | 10/2002 | Coles et al. |
| 6,527,660 B1 | 3/2003 | Sugden |
| 6,561,940 B2 | 5/2003 | Goi et al. |
| 6,631,703 B2 | 10/2003 | Tonnqvist et al. |
| 6,672,049 B2 | 1/2004 | Franchet et al. |
| 6,825,640 B1 | 11/2004 | Hill et al. |
| 6,895,741 B2 | 5/2005 | Rago et al. |

* cited by examiner

MORE ELECTRIC AIRCRAFT POWER TRANSFER SYSTEMS AND METHODS

CROSS-REFERENCES TO RELATED APPLICATIONS

This application claims the benefit of U.S. Provisional Application No. 60/688,496, filed Jun. 7, 2005.

TECHNICAL FIELD

The present invention relates to turbofan gas turbine propulsion engines and, more particularly, to systems for transferring power from the low pressure turbine to the high pressure turbine and/or extracting additional power from the low pressure turbine in turbofan gas turbine propulsion engines.

BACKGROUND

Aircraft main propulsion engines not only generate propulsion thrust for the aircraft, but in many instances may also be used to drive various other rotating components such as, for example, generators, compressors, and pumps, to thereby supply electrical, pneumatic, and/or hydraulic power. In multi-spool turbofan gas turbine engines, this is accomplished via a plurality of turbines. In particular, each turbine receives a flow of combusted gas from a combustor and, in response, generates shaft power that is used to drive one or more of these rotational components, via a plurality of concentric shafts. Thus, a portion of the shaft power that each turbine generates is used to provide propulsion thrust, while another portion of the generated shaft power is extracted and used to drive these other rotational components.

In recent years, aircraft architectures are being provided that rely more and more on electrical power, and less on pneumatic (e.g., bleed air) and/or hydraulic power. In such architectures, shaft power extraction demand can increase significantly. For example, shaft power extraction demand can be as much as 200% to 300% more than traditional solutions such as bleed air and/or hydraulic power. Although these architectures are generally safe, robust, and reliable, the architectures may suffer certain drawbacks. For example, high shaft power extraction demand can negatively impact engine compressor surge margin. A relatively straightforward technique to mitigate this drawback is to increase the engine speed and bleed during high shaft power extraction demands. This solution, however, can increase both the fuel burn rate and the residual thrust that the engine generates, most notably during flight and ground idle conditions, as well as during transients. The increased residual thrust can result in increased brake usage on the ground and/or increased airbrake usage in flight.

Hence, there is a need for a system for a more electric aircraft architecture that improves the surge margin of the propulsion engine compressors and/or improves engine operability and/or, at least during high power extraction demands, reduces fuel burn rate and/or reduces the residual thrust that the engines generate. The present invention addresses one or more of these needs.

BRIEF SUMMARY

The present invention provides systems for transferring power from the low pressure turbine to the high pressure turbine and/or shift some load from the high pressure turbine to the low pressure turbine in turbofan gas turbine propulsion engines.

In one embodiment, and by way of example only, a multi-spool gas turbine engine includes a low pressure turbine, a hydraulic pump, a hydraulic motor, and a high pressure turbine. The low pressure turbine is adapted to receive a flow of combusted gas and is operable, upon receipt thereof, to generate a rotational drive force. The hydraulic pump is adapted to receive hydraulic fluid at a supply pressure and is coupled to receive a portion of the rotational drive force supplied from the low pressure turbine, and is operable, upon receipt of the portion of the rotational drive force, to supply the hydraulic fluid at an increased pressure. The hydraulic motor is coupled to receive the increased pressure hydraulic fluid from the hydraulic pump and is operable, upon receipt thereof, to generate a rotational drive force and discharge the hydraulic fluid at a decreased pressure. The high pressure turbine is adapted to receive a flow of combusted gas and is coupled to receive the rotational drive force supplied from the hydraulic motor. The high pressure turbine is responsive to the flow of combusted gas and the rotational drive force to generate a rotational drive force.

In another exemplary embodiment, a multi-spool gas turbine engine includes a differential gear assembly, a generator, a high pressure turbine, a low pressure turbine, and a clutch assembly. The differential gear assembly has a first input and a second input, and is configured, upon rotation of the first input, the second input, or both inputs, to supply a rotational drive force. The generator is coupled to receive the rotational drive force supplied from the differential gear assembly and is operable, upon receipt thereof, to generate electrical energy. The high pressure turbine is coupled to the differential gear assembly first input and is adapted to receive a flow of combusted gas. The high pressure turbine is operable, upon receipt of the combusted gas, to rotate at a first rotational speed. The low pressure turbine is adapted to receive a flow of combusted gas and is operable, upon receipt of the combusted gas, to rotate at a second rotational speed. The clutch assembly is coupled between the low pressure turbine and the differential gear assembly second input, and is movable between an engaged position, in which the low pressure turbine is coupled to the differential gear assembly second input, and a disengaged position, in which the low pressure turbine is decoupled from the differential gear assembly second input.

In yet a further exemplary embodiment, a multi-spool gas turbine engine includes a high pressure turbine and a low pressure turbine, a high pressure generator, a plurality of clutch assemblies, a multi-speed gear assembly, and a low pressure generator. Each of the turbines is adapted to receive a flow of combusted gas and is operable, upon receipt thereof, to generate rotational energy. The high pressure generator is coupled to receive at least a portion of the rotational energy generated by the high pressure turbine and is operable, upon receipt thereof, to generate electrical energy. Each clutch assembly is movable between an engaged position and a disengaged position. The multi-speed gear assembly is coupled to receive at least a portion of the rotational energy generated by the low pressure turbine and is coupled to each of the clutch assemblies. The multi-speed gear assembly is operable, upon receipt of the rotational energy and in dependence on the position of each of the clutch assemblies, to supply a rotational drive force over one of a plurality of rotational speed ranges. The low pressure generator is coupled to receive the rotational drive force from the multi-speed gear assembly and is operable, upon receipt thereof, to generate electrical energy.

Other independent features and advantages of the preferred power transfer systems will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the following detailed description is merely exemplary in nature and is not intended to limit the invention or the application and uses of the invention. In this regard, it is to be additionally appreciated that the described embodiment is not limited to use in conjunction with a particular type of turbine engine. Hence, although the present embodiment is, for convenience of explanation, depicted and described as being implemented in a multi-spool gas turbine jet engine, it will be appreciated that it can be implemented in various other types of turbines, and in various other systems and environments. Furthermore, there is no intention to be bound by any theory presented in the preceding background or the following detailed description.

Figure 1:
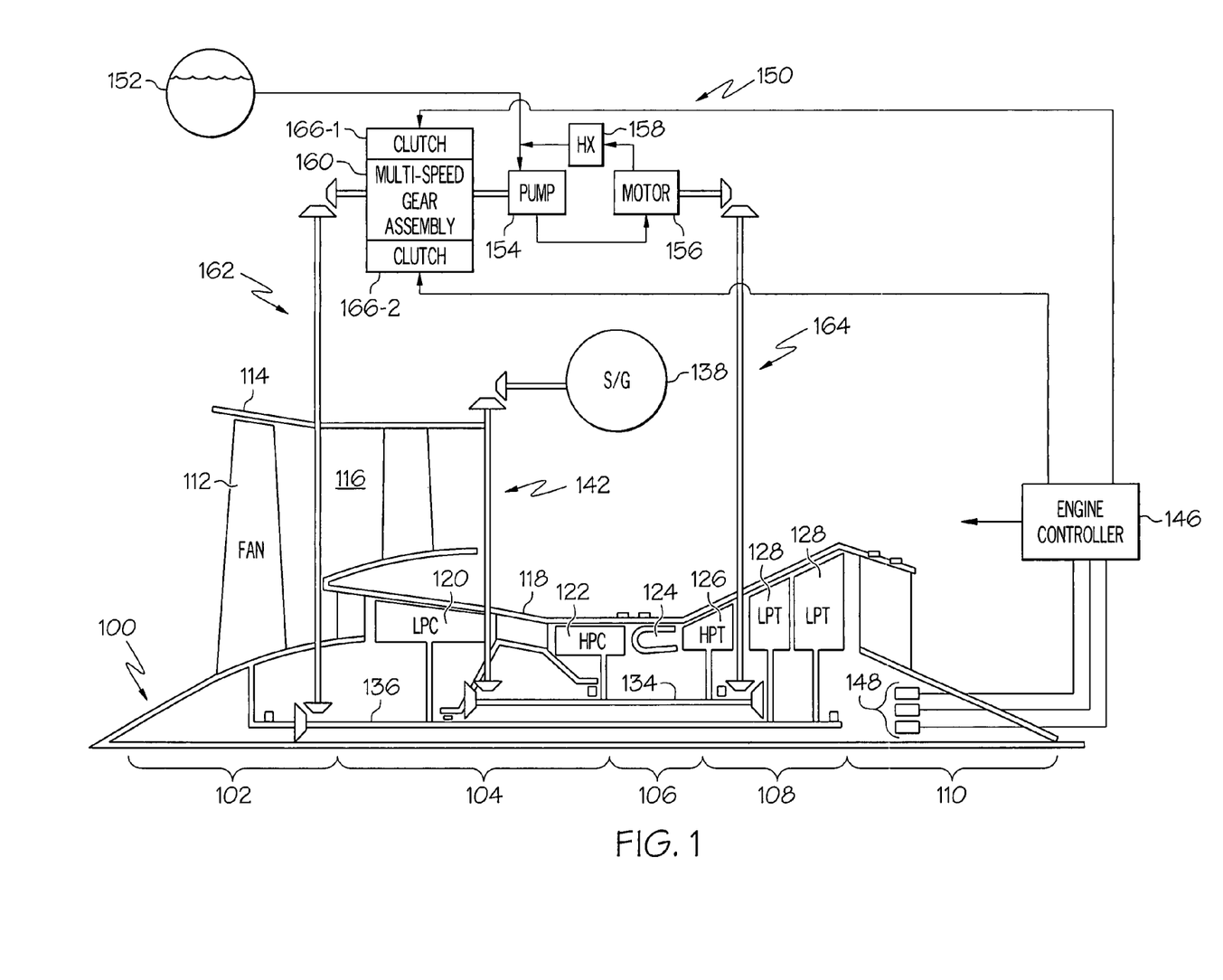
FIG. 1 is a functional schematic representation of an exemplary turbo-fan gas turbine engine that includes a power transfer system according to a first embodiment of the present invention.

A simplified representation of an exemplary multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 (shown only partially in FIG. 1) disposed between the fan case 114 and an engine case 118, and provides a forward thrust. The remaining fraction of air exhausted from the fan 112 is directed into the compressor section 104.

The compressor section 104 includes two compressors, a low pressure compressor 120, and a high pressure compressor 122. The low pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a combustor 124, a plurality of non-illustrated fuel injectors, and one or more non-illustrated igniters, the high pressure air is mixed with fuel and combusted. The combusted air is then directed into the turbine section 108.

The turbine section 108 includes two turbines, a high pressure turbine 126 and a low pressure turbine 128, disposed in axial flow series in the engine case 118. The combusted air from the combustion section 106 expands through each turbine 126, 128, causing each to rotate. The air is then exhausted through a propulsion nozzle disposed in the exhaust section 110, providing addition forward thrust. As the turbines rotate, each drives equipment in the engine 100 via concentrically disposed shafts or spools. For example, the low pressure turbine 128 drives the fan 112 and the low pressure compressor 120 via a low pressure spool 136, and the high pressure turbine 126 drives the high pressure compressor 122 via a high pressure spool 134.

As will be described further below, the low pressure turbine 128 may additionally drive one or more other components to transfer a portion of the power it generates to the high pressure turbine 126. Moreover, the high pressure turbine 126, in addition to driving the high pressure compressor 122, also drives one or more generators 138 (only one shown in FIG. 1). More specifically, the high pressure spool 134 is coupled to the generator 138 via a power take-off assembly 142. With this arrangement, whenever the high pressure turbine 126 rotates, it supplies a drive force, via the power take-off assembly 142, to the generator 138, which in turn generates electrical power. The electrical power is supplied, for example, to the aircraft electrical distribution system (not illustrated) for use by various other systems and components.

It will be appreciated that the generator 138 may be implemented as any one of numerous types of AC or DC generators or starter-generators, but in a preferred embodiment it is implemented as a brushless AC starter-generator. A starter-generator, as is generally known, is configured to operate, when properly energized, in either a motor mode or a generator mode. In the motor mode, electrical energy is supplied to the starter-generator 138 from, for example, the aircraft electrical distribution system and is converted to rotational energy. This rotational energy is then supplied, via the power take-off assembly 142, to the high pressure turbine 130. Conversely, in the generator mode, rotational energy from the high pressure turbine 130 is supplied to the generator 138, via the power take-off assembly 142, and is converted to electrical energy. The electrical energy, as noted above, is then supplied to the aircraft electrical distribution system.

The overall operation of the engine 100 is controlled via an engine controller 146. The engine controller 146, as is generally known, is used to control the output power of the engine 100 by, for example, controlling fuel flow rate to the engine 100, as well as controlling airflow through the engine 100. In the depicted embodiment, the engine controller 146 receives signals from a plurality of sensors 148 that are disposed at various locations on and within the engine 100. The sensors 148 are used to sense various physical parameters associated with the engine 100 such as, for example, various temperatures, engine speed, and air flow, and supply signals representative of the sensed parameters to the engine controller 146. The engine controller 146 processes the signals received from the sensors 148 and, among other things, supplies various commands to the engine 100 to control its operation. It will be appreciated that the engine controller 146 may be any one of numerous types of engine controllers such as, for example, a FADEC (Full Authority Digital Engine Controller) or an EEC (Electronic Engine Controller).

As was previously mentioned, during relatively low engine thrust operations the starter-generator 138, operating in the generator mode, still needs to supply the needed electrical load. Thus, the starter-generator 138 still needs to be supplied with sufficient drive force to generate the needed electrical energy. To ensure that an undesired amount of thrust is not generated and/or and undesired amount of energy is not wasted during such conditions, the engine 100 additionally includes a power transfer system 150. The power transfer system 150, which will now be described in more detail, is configured to transfer a portion of the power from the low pressure turbine 128 to the high pressure turbine 126, at least during certain flight and/or ground conditions.

The power transfer system 150 may be implemented according to various configurations and using various components. In the depicted embodiment, the power transfer system 150 is configured as a hydrostatic power transfer system and includes a hydraulic fluid source 152, a hydraulic pump 154, a hydraulic motor 156, a heat exchanger 158, and a multi-speed gear assembly 160. The hydraulic fluid source 152 supplies hydraulic fluid at a supply pressure. It will be appreciated that the hydraulic fluid source 152 may be any one of numerous hydraulic fluid sources available on or within an aircraft. It will additionally be appreciated that the specific type of hydraulic fluid that the hydraulic fluid source 152 supplies may be any one of numerous types of hydraulic fluids including, for example, oil or fuel; Preferably, the hydraulic fluid is oil or other suitable lubricant, and the hydraulic fluid source 152 is the engine lubricant system, or is at least supplied from the engine lubricant system. However, if fuel is used has the hydraulic fluid, the hydraulic pump 154 could also be used as the engine fuel pump.

The hydraulic pump 154 is coupled to the hydraulic fluid source 152 and is driven by the low pressure turbine 128 via the low pressure spool 136. More specifically, at least in the depicted embodiment, the hydraulic pump 154 is coupled to the low pressure spool 136 via the multi-speed gear assembly 160 and a second power take-off assembly 162. Thus, whenever the low pressure turbine 128 rotates, it supplies a drive force, via the second power take-off assembly 162 and the multi-speed gear assembly 160, to the hydraulic pump 154. The hydraulic pump 154, in response to the supplied drive force, draws hydraulic fluid from the hydraulic fluid source 152, increases the pressure of the hydraulic fluid, and supplies the hydraulic fluid at the increased pressure to the hydraulic motor 156.

The multi-speed gear assembly 160 is coupled between the hydraulic pump 154 and the power take-off assembly 162 and thus receives at least a portion of the rotational energy generated by the low pressure turbine 128. The multi-speed gear assembly 160 is configured to implement a plurality of rotational drive speed ratios. Thus, for a given low pressure turbine 128 rotational speed, the multi-speed gear assembly 160 is configured to supply a rotational drive force to the hydraulic pump 154 at one of a plurality of rotational drive speeds. It will be appreciated that the multi-speed gear assembly 160 may implement any one of numerous rotational drive speed ratios to provide a desired or suitable hydraulic pump 154 speed range over the speed ratio of the low pressure turbine 128. In the depicted embodiment, however, the multi-speed gear assembly 160 implements two rotational drive speed ratios, to thereby drive the hydraulic pump over two speed ranges.

The particular rotational drive speed ratio that the multi-speed gear assembly 160 implements, and thus the particular speed range over which the hydraulic pump 154 is driven, is controlled via one or more clutch assemblies 166. In the depicted embodiment, two clutch assemblies 166 (166-1, 166-2) are coupled to the mutli-speed gear assembly 160. It will be appreciated, however, that this is merely exemplary and that more or less than this number of clutch assemblies 166 may be used. No matter the specific number of clutch assemblies 166 used, each is responsive to clutch actuation commands to move between an engaged position and a disengaged. In the depicted embodiment, the clutch actuation commands are supplied to the clutch assemblies 166 from the engine controller 146. It will be appreciated, however, that the clutch actuation commands could be supplied from a separate control circuit. Moreover, the clutch assemblies 166 and clutch actuation commands could be implemented according to any one of numerous configurations and signal paradigms. In the depicted embodiment, however, the clutch assemblies 166 are configured to move to the disengaged position when de-energized. With this configuration, the clutch assemblies 166 automatically move to the disengaged position if electrical power is lost.

No matter the particular implementation of the clutch assemblies 166 and clutch actuation commands, the depicted embodiment is preferably implemented such that when one clutch assembly 166-1 (166-2) is in the engaged position the other clutch assembly 166-2 (166-1) is in the disengaged position. It will be appreciated that when each clutch assembly 166 is in the engaged position, it locks one or more gears within the multi-speed gear assembly 160 to provide the multiple speed ranges. For example, in one particular implementation, when one clutch assembly 166-1 is in the engaged position, it locks a carrier gear (not illustrated), and when the other clutch 166-2 is in the engaged position, it locks a sun gear (also not illustrated).

The hydraulic motor 156 is coupled to receive, and is thus powered by, the increased pressure hydraulic fluid from the hydraulic pump 154. More specifically, as the hydraulic fluid flows through the hydraulic motor 156, the hydraulic motor 156 extracts a portion of the flow energy in the hydraulic fluid and converts it to mechanical energy, thereby generating a rotational drive force. The generated rotational drive force is in turn supplied to the high pressure turbine 126 to assist it in driving the generator 138. More specifically, the hydraulic motor 156 is coupled to the high pressure spool 134 via a third power take-off assembly 164. Because the hydraulic motor 156 extracts a portion of the flow energy in the hydraulic fluid, the hydraulic fluid is discharged from the hydraulic motor 156 at a decreased pressure.

The hydraulic fluid that is discharged from the hydraulic motor 156 may be at a temperature that is sufficiently high to necessitate its cooling. Thus, in the depicted embodiment the hydraulic fluid that is discharged from the hydraulic motor 156 is directed into the heat exchanger 158. The heat exchanger 158, like any one of numerous conventional heat exchangers, transfers heat from the hydraulic fluid to a heat sink, and discharges cooled hydraulic fluid. It will be appreciated that the heat exchanger 158 may be implemented using any one of numerous types of heat exchangers now known or developed in the future for transferring heat from a fluid to a heat sink. It will additionally be appreciated that the heat sink may be any one of numerous types of fluids including, for example, any one of numerous liquids or gases, or any one of numerous types of solid heat sink elements.

No matter the specific manner in which the heat exchanger 158 is implemented, if it is included the cooled hydraulic fluid that is discharged from the heat exchanger 158 may be directed to other, non-illustrated components, directly back to the hydraulic fluid source 152 or back to the hydraulic pump 154. As FIG. 1 shows, in the depicted embodiment the cooled hydraulic fluid is directed back to the hydraulic pump 154.

Before proceeding further, it will be appreciated that the hydraulic pump 154 and hydraulic motor 156 may be implemented using any one of numerous types of hydraulic pumps and motors. In a particular preferred embodiment, however, the hydraulic pump 154 and hydraulic motor 156 are implemented as a variable displacement hydraulic pump and a variable displacement hydraulic motor, respectively. Using a variable displacement hydraulic pump 154 and a variable displacement hydraulic motor 156, and appropriately selecting the relative sizes of the variable displacement hydraulic pump and motor 154 and 156, permits better speed matching of the low pressure and high pressure spools 136, 134 at different engine power settings. Although not depicted in FIG. 1, it will be appreciated that, depending on the speed ranges of the low and high pressure turbines 128, 126, and the speed ratios of the low and high pressure turbines 128, 126 over the individual speed ranges, one or more additional clutches and/or one or more single speed gear assemblies or a multi-speed gear assemblies may be coupled between the high pressure spool 136 and the hydraulic motor 156 to even better facilitate speed matching of the low pressure and high pressure spools 136, 134 at different engine power settings.

The engine 100 depicted in FIG. 1 and described above utilizes a hydrostatic power transfer system 150 to transfer power from the low pressure turbine 128 to the high pressure turbine 126. It will be appreciated that this is merely exemplary of one particular embodiment for implementing this functionality, and that other embodiments, such as those depicted in FIGS. 2 and 3, may also be used and will now be described. In doing so, it will be appreciated that the engines 100 depicted in FIGS. 2 and 3, with the exception of the associated power transfer or power removal systems, are substantially identical to the engine 100 depicted in FIG. 1 and described above. As such, the substantially identical portions thereof are referenced using like reference numerals, and descriptions of the substantially identical portions will not be repeated.

Figure 2:
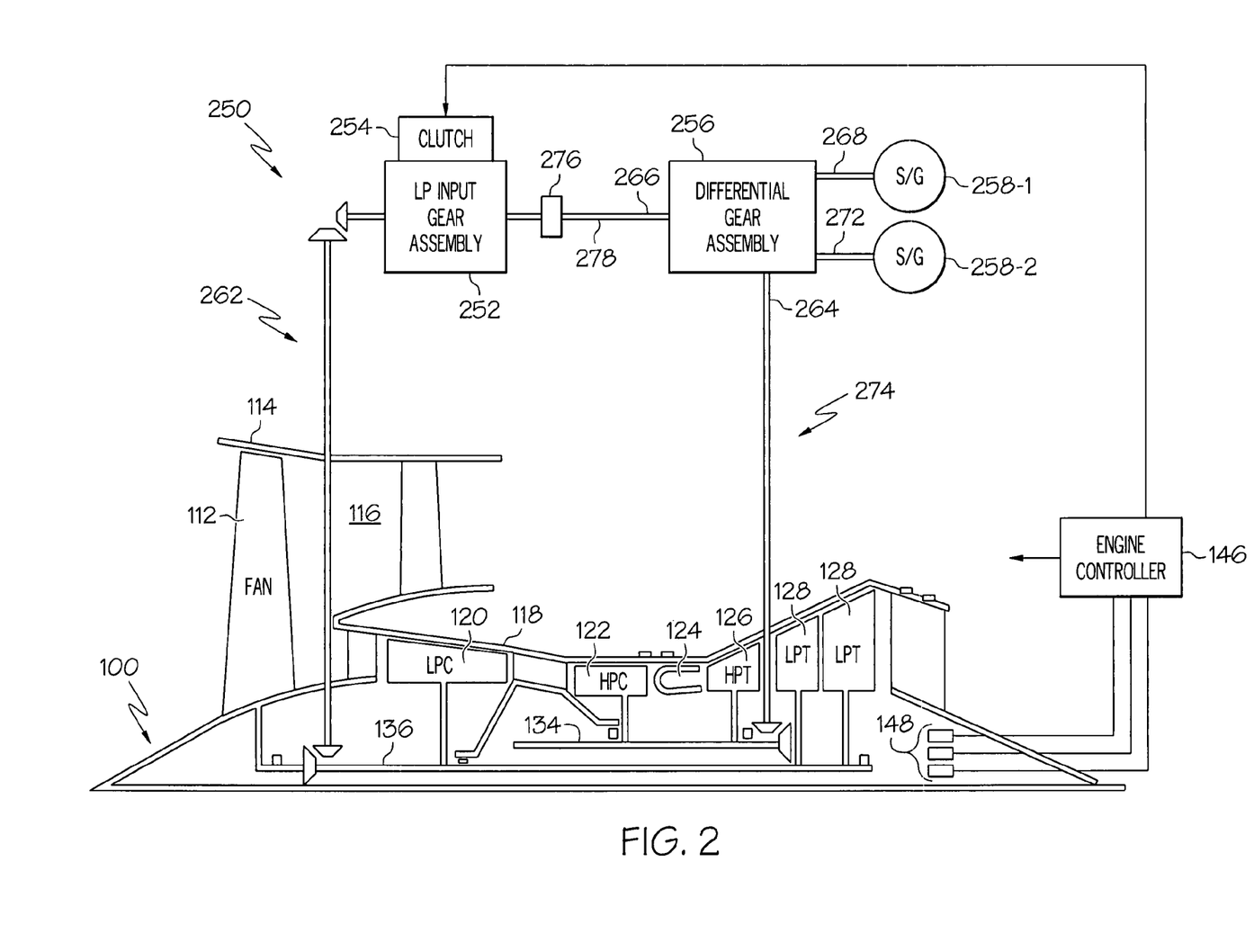
FIG. 2 is a functional schematic representation of an exemplary turbo-fan gas turbine engine that includes a power transfer system according to a second embodiment of the present invention.

Turning now to FIG. 2, the power transfer system 250 depicted therein includes a low pressure input gear assembly 252, a clutch assembly 254, a differential gear assembly 256, and two generators 258 (258-1, 258-2). The low pressure input gear assembly 252 is coupled, via a power take-off assembly 262 and the low pressure spool 136, to receive a rotational drive force from the low pressure turbine 128. Depending on the position of the clutch assembly 254, the low pressure input gear assembly 252 is either coupled to or decoupled from the differential gear assembly 256. When the low pressure input gear assembly 252 coupled to the differential gear assembly 256, at least a portion of the rotational drive force received from the low pressure turbine 128 is supplied to the differential gear assembly 256. When the low pressure input gear assembly is decoupled from the differential gear assembly 256, none of the rotational drive force is supplied thereto.

The clutch assembly 254 is coupled to the low pressure input gear assembly 252 and is responsive to clutch actuation commands to move between an engaged position and a disengaged. In the engaged position, the clutch assembly couples the low pressure input gear assembly 252 to the differential gear assembly 256. Conversely, when the clutch assembly 254 is in the disengaged position, the low pressure input gear assembly 252 is decoupled from the differential gear assembly 256. In the depicted embodiment, the clutch actuation commands are supplied to the clutch assembly 254 from the engine controller 146. It will be appreciated, however, that the clutch actuation commands could be supplied from a separate control circuit. Moreover, the clutch assembly 254 and clutch actuation commands could be implemented according to any one of numerous configurations and signal paradigms. In the depicted embodiment, however, the clutch assembly 254 is configured to move to the disengaged position when it is de-energized. With this configuration, if electrical power is lost to the clutch assembly 254, it will automatically move to the disengaged position and decouple the low pressure input gear assembly 252 from the differential gear assembly 256.

The differential gear assembly 256 includes at least two inputs, a first input 264 and a second input 266, and two outputs, a first output 268 and a second output 272. The differential gear assembly first input 264 is coupled to the high pressure turbine 126, and the differential gear assembly second input 266 is coupled to the low pressure input gear assembly 252. More specifically, at least in the depicted embodiment, the differential gear assembly first input 264 is coupled to the high pressure turbine 126 via a second power take-off assembly 274 and the high pressure spool 134, and the differential gear assembly second input 266 is coupled to the low pressure input gear assembly 252 via a sprag clutch 276 and interconnecting shaft 278. Thus, the differential gear assembly 256 receives a rotational drive force supplied from the high pressure turbine 126 via its first input 264 and, depending on the position of the clutch assembly 254 and the sprag clutch 276, a rotational drive force from the low pressure input gear assembly 252 via its second input 266.

It will be appreciated that the sprag clutch 276, similar to the clutch assembly 254, is movable between an engaged position and a disengaged. In the engaged position, the sprag clutch 276 couples the low pressure input gear assembly 252 to the differential gear assembly second input 266. Conversely, when the sprag clutch 276 is in the disengaged position, the low pressure input gear assembly 252 is decoupled from the differential gear assembly second input 266. Normally, the sprag clutch 276 is positioned to the engaged position, regardless of the position of the clutch assembly 254. It will additionally be appreciated that the power transfer system 250 could be implemented without the sprag clutch 276.

Whether or not the sprag clutch 276 is included, the differential gear assembly 256, upon receipt of a rotational drive force at either or both of its inputs 264, 266, supplies a rotational drive force via its first and second outputs 268, 272. As FIG. 2 shows, one of the generators 258-1 is coupled to the differential gear assembly first output 268, and the other generator 258-2 is coupled to the differential gear assembly second output 272. Thus, when the clutch assembly 254 is in the disengaged position, the generators 258-1, 258-2 are driven solely by the high pressure turbine 126. However, when the clutch assembly 254 is in the engaged position, the generators 258-1, 258-2 are driven by both the high pressure turbine 126 and the low pressure turbine 128. It will be appreciated that this configuration is merely exemplary, and that in an alternative embodiment, the differential gear assembly 256 could be configured such that when the clutch assembly 254 is in the disengaged position, the generators 258-1, 258-2 are driven solely by the high pressure turbine 126, and when the clutch assembly 254 is in the engaged position, one of the generators 258-1 continues to be driven solely by the high pressure turbine 126, and the other generator 258-2 is driven by both the high pressure turbine 126 and the low pressure turbine 128.

It will be appreciated that the generators 258 may be implemented as any one of numerous types of AC or DC generators or starter-generators, and that either or both may be generators or starter-generators. In a preferred embodiment, however, both are implemented as brushless AC starter-generators. It will additionally be appreciated that the differential gear assembly 256 may implemented as any one of numerous types of differential gear assemblies, but in the depicted embodiment it is implemented as a speed summing differential gear assembly. Moreover, the specific gear ratios implemented in both the low pressure input gear assembly 252 and the differential gear assembly 256, and the low pressure turbine rotational speed ranges over which the clutch assembly 254 is engaged and disengaged, may vary from engine to engine and generator to generator to meet desired performance and load sharing goals.

In one particular exemplary embodiment, the engine 100 is configured such that the high pressure turbine 126 rotational speed ranges from 8,400 to 9,000 rpm as the fan 112 rotational speed ranges from 650 to 1,100 rpm. With this embodiment, the engine controller 146 is configured to command the clutch assembly 254 to the engaged position for fan 112 speeds below 1,100 rpm, and to the disengaged position for fan 112 speeds at or above 1,100 rpm. Moreover, the low pressure input gear assembly 252 and the differential gear assembly 256 are configured such that, when the clutch assembly 254 is in the engaged position, the generators 258 are each rotated over a rotational speed range of 7,200 to 13,200 rpm, and the power to the generators 258 is split over a range of from 40/60 (LP/HP) to 50/50, respectively. Then, when the engine controller 146 commands the clutch assembly 254 to the disengaged at 1,100 rpm, all power to the generators 258 is supplied solely from the high pressure turbine 126, and the generator rotational speeds drop down to 7,200 rpm. Thereafter, as high pressure turbine rotational speed increases to 13,000 rpm (100%), the generator rotational speeds increase commensurately up to 10,400 rpm.

Figure 3:
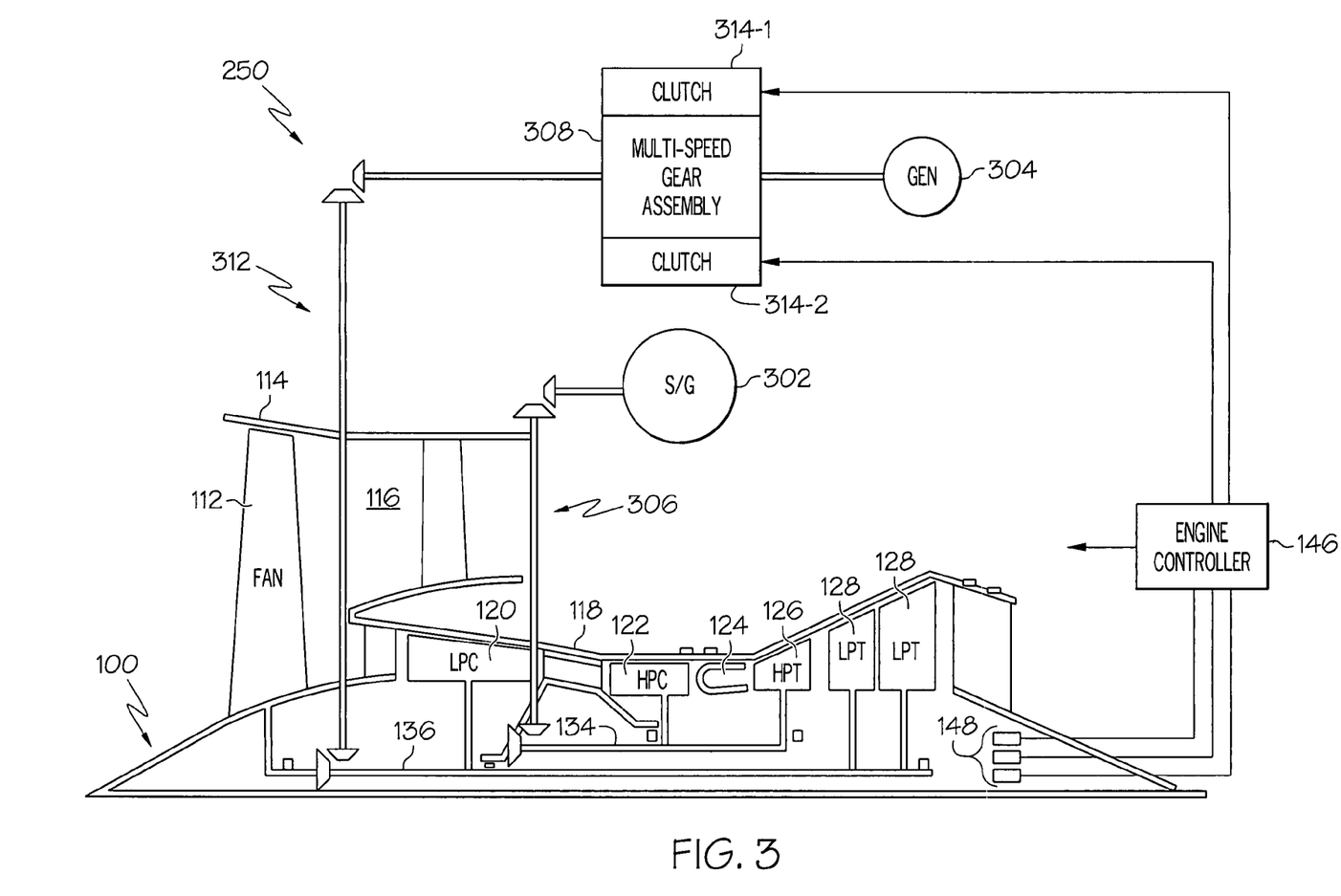
FIG. 3 is a functional schematic representation of an exemplary turbo-fan gas turbine engine that includes a power transfer system according to a third embodiment of the present invention.

With reference now to FIG. 3, the remaining alternative embodiment alluded to above will be described. This embodiment does not include a power transfer system 150, 250. Instead, the high pressure turbine 126 powers one generator, referred to herein as a high pressure generator 302, and the low pressure turbine 128 independently powers a second generator, which referred to herein as a low pressure generator 304. In particular, the high pressure generator 302, similar to the embodiment depicted in FIG. 1, is preferably implemented as a starter-generator. The high pressure generator 302 is similarly coupled, via a power take-off assembly 306, to either receive or supply rotational drive force from or to the high pressure turbine 126, depending on whether it is operating in the generate mode or the motor mode.

The low pressure generator 304 is coupled to the low pressure turbine 128 via a multi-speed gear assembly 308. More specifically, at least in the depicted embodiment, the low pressure generator 304 is coupled to the low pressure turbine 128 via the multi-speed gear assembly 308, a second power take-off assembly 312, and the low pressure spool 136. Thus, whenever the low pressure turbine 128 rotates, it supplies a drive force, via the second power take-off assembly 312 and the multi-speed gear assembly 308, to the low pressure generator 304. The low pressure generator 304, in response to the supplied drive force, rotates and generates electrical power. It will be appreciated that the low pressure generator 304 may be implemented as any one of numerous types of AC or DC generators, but in a preferred embodiment it is implemented as a brushless AC generator.

The multi-speed gear assembly 308 is coupled between the low pressure generator 304 and the second power take-off assembly 312 and thus receives at least a portion of the rotational energy generated by the low pressure turbine 128. The multi-speed gear assembly 308 is configured to implement a plurality of rotational drive speed ratios. Thus, for a given low pressure turbine 128 rotational speed, the multi-speed gear assembly 308 is configured to supply a rotational drive force to the low pressure generator 304 at one of a plurality of rotational drive speeds. It will be appreciated that the multi-speed gear assembly 308 may implement any one of numerous rotational drive speed ratios to provide a desired or suitable low pressure generator 304 speed range over the speed ratio of the low pressure turbine 128. In the depicted embodiment, however, the multi-speed gear assembly 308 implements two rotational drive speed ratios, to thereby drive the low pressure generator 304 over two speed ranges.

The particular rotational drive speed ratio that the multi-speed gear assembly 308 implements, and thus the particular speed range over which the low pressure generator 304 is driven, is controlled via one or more clutch assemblies 314. In the depicted embodiment, two clutch assemblies 314 (314-1, 314-2) are coupled to the mutli-speed gear assembly 308. It will be appreciated, however, that this is merely exemplary and that more or less than this number of clutch assemblies 314 may be used. No matter the specific number of clutch assemblies 314 used, each is responsive to clutch actuation commands to move between an engaged position and a disengaged. In the depicted embodiment, the clutch actuation commands are supplied to the clutch assemblies 314 from the engine controller 146. It will be appreciated, however, that the clutch actuation commands could be supplied from a separate control circuit. Moreover, the clutch assemblies 314 and clutch actuation commands could be implemented according to any one of numerous configurations and signal paradigms. In the depicted embodiment, however, the clutch assemblies 314 are configured to move to the disengaged position when de-energized. With this configuration, the clutch assemblies 314 automatically move to the disengaged position if electrical power is lost.

No matter the particular implementation of the clutch assemblies 314 and clutch actuation commands, the depicted embodiment is preferably implemented such that when one clutch assembly 314-1 (314-2) is in the engaged position the other clutch assembly 314-2 (314-1) is in the disengaged position. It will be appreciated that when each clutch assembly 314 is in the engaged position, it locks one or more gears within the multi-speed gear assembly 308 to provide the multiple speed ranges. For example, in one particular implementation, when one clutch assembly 314-1 is in the engaged position, it locks a carrier gear (not illustrated), and when the other clutch 314-2 is in the engaged position, it locks a sun gear (also not illustrated).

The engines and systems described herein transfer power from the low pressure turbine to the high pressure turbine and/or extract additional load from the low pressure turbine during certain turbofan engine operational conditions. As a result, the engine exhibits improved the compressor surge margin, improved engine operability, and reduced fuel burn rate and reduced residual thrust during high power extraction demands.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A multi-spool gas turbine engine, comprising: a differential gear assembly having a first input and a second input, the gear assembly configured, upon rotation of the first input, the second input, or both inputs, to supply a rotational drive force at a first rotational speed;

a generator coupled to receive the rotational drive force supplied from the differential gear assembly and operable, upon receipt thereof, to generate electrical energy;

a high pressure turbine coupled to the differential gear assembly first input and adapted to receive a flow of combusted gas, the high pressure turbine operable, upon receipt of the combusted gas, to rotate at a second rotational speed;

a low pressure turbine adapted to receive a flow of combusted gas, the low pressure turbine operable, upon receipt of the combusted gas, to rotate at a third rotational speed;

a clutch assembly coupled between the low pressure turbine and the differential gear assembly second input, the clutch assembly movable between an engaged position, in which the low pressure turbine is coupled to the differential gear assembly second input, and a disengaged position, in which the low pressure turbine is decoupled from the differential gear assembly second input; and a low pressure input gear assembly coupled to the clutch assembly, the differential gear assembly second input, and the low pressure turbine, the low pressure input gear assembly configured, when the clutch assembly is in the engaged position, to (i) couple the low pressure turbine to the differential gear assembly second input and (ii) increase the third rotational speed to a fourth rotational speed.

2. The engine of claim 1, further comprising:

a sprag clutch coupled between the low pressure input gear assembly and the differential gear assembly, the sprag clutch movable between an engaged position, in which the low pressure input gear assembly is coupled to the differential gear assembly second input, and a disengaged position, in which the low pressure input gear assembly is decoupled from the differential gear assembly second input.

3. The engine of claim 1, wherein:

the clutch assembly is responsive to clutch actuation commands to move between the engaged and disengaged positions; and the engine further comprises a control circuit operable to selectively supply the clutch actuation commands to the clutch assembly.

4. The engine of claim 1, wherein the generator is a starter-generator that is configured to selectively operate in either (i) a motor mode, in which electrical energy is converted to rotational energy and supplied to the differential gear assembly or (ii) a generator mode, in which the rotational drive force supplied thereto from the differential gear assembly is converted to electrical energy.

5. The engine of claim 1, further comprising:

a second generator coupled to receive the rotational drive force supplied from the differential gear assembly, the second generator operable, upon receipt of the rotational drive force, to generate electrical energy.

6. The engine of claim 5, wherein the second generator is a starter-generator that is configured to selectively operate in either (i) a motor mode, in which electrical energy is converted to rotational energy and supplied to the differential gear assembly or (ii) a generator mode, in which the rotational drive force supplied thereto from the differential gear assembly is converted to electrical energy.

7. The engine of claim 1, wherein the differential gear assembly is a speed summing differential gear assembly.

* * * * *